May 9, 1933.                J. D. SARTAKOFF                 1,908,489
                      FOOD PRODUCT AND ITS MANUFACTURE
                    Filed Dec. 23, 1931       3 Sheets-Sheet 1

May 9, 1933.        J. D. SARTAKOFF        1,908,489
FOOD PRODUCT AND ITS MANUFACTURE
Filed Dec. 23, 1931        3 Sheets-Sheet 2
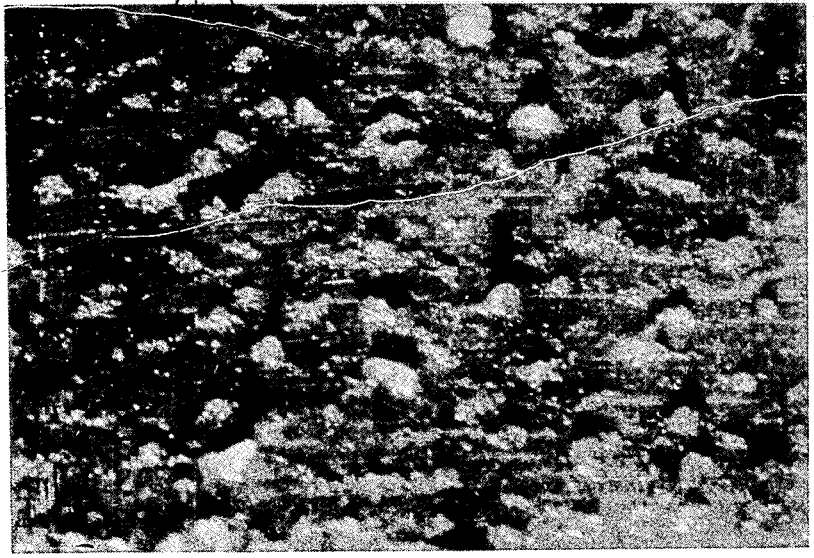

May 9, 1933. J. D. SARTAKOFF 1,908,489
FOOD PRODUCT AND ITS MANUFACTURE
Filed Dec. 23, 1931 3 Sheets-Sheet 3

INVENTOR
Jack D. Sartakoff
BY
Emery, Booth, Vaney & Voluntine
ATTORNEYS

Patented May 9, 1933

1,908,489

UNITED STATES PATENT OFFICE

JACK D. SARTAKOFF, OF JACKSON HEIGHTS, NEW YORK, ASSIGNOR TO SARDIK, INC., OF NEW YORK, N. Y., A CORPORATION OF DELAWARE

FOOD PRODUCT AND ITS MANUFACTURE

Application filed December 23, 1931. Serial No. 582,815.

This invention relates to food products and their manufacture, and more particularly to the treatment of certain foods to reduce their moisture content and preferably to render them substanially impervious to ordinary deteriorating influences, so that they may not only be kept for prolonged periods of time without losing their nutritional properties or their palatability, but when desired can be quickly prepared for use.

Heretofore, efforts have been made and processes devised for reducing the moisture content of certain foods to preserve them and lessen their bulk. Some success has been attained with foods containing certain forms of starch, such as the potato, but, so far as I am aware, known processes have failed to provide an entirely satisfactory commercial product from sugar or acid containing foods having a pronounced and definite cell structure.

An object of this invention is to provide in a practical form a deterioration-resistant food product capable of rapid absorption of liquid to produce an edible food possessing substantially the nutritional and palatable properties of the original material.

A further object is to provide a food product of the type set forth in a form having a relatively small bulk, permitting the economical storage and transportation thereof, and in such a condition that it can be easily and cheaply packaged for storage, distribution and sale.

A still further object is to provide a practicable and economical method of manufacturing such a product on a commercial scale.

These and other objects which will be apparent to those skilled in this particular art are attained by means of the present invention, one embodiment of which is illustrated in the accompanying drawings in which, Fig. 1 is a diagrammatic end view of one type of apparatus which can be used to carry out the present method.

Fig. 2 is a fragmentary front elevation of apparatus such as is shown diagrammatically in Fig. 1. This view is considerably enlarged with respect to Fig. 1 and shows, substantially in full scale, a part of the final product leaving the apparatus at the right; the left hand part having been broken away in order to expose to view the material on the drying surface prior to the time of its removal therefrom. The cutting roller shown in this figure is used only for the purpose of separating the material so that one part can be readily removed for the purposes of this figure.

Fig. 3 is a greatly magnified face view of a small portion of the drying surface showing the arrangement of the material thereon near the beginning of the drying operation.

Fig. 4 is a similar view on the same scale as Fig. 3 showing the arrangement of material on the drying surface near the end of the drying operation.

Figure 1:
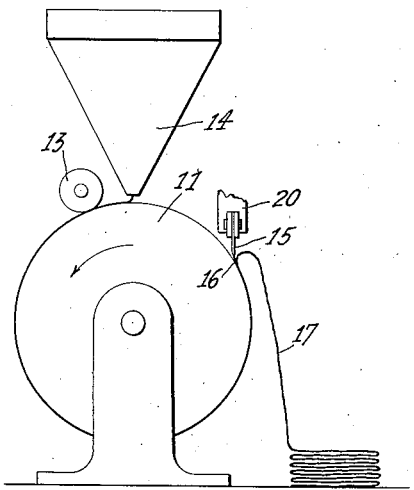

In carrying out the present invention a suitable non-starchy, non-farinaceous food, which may be a natural food or a prepared product, having a cellular structure and natural binding agents such as sugar, acids, pectin, or the like, is subjected to a drying operation while finely divided particles of the material are separated from each other in such a dispersed condition as to insure the drying of each individual particle or cell to the desired extent and so rapidly as to minimize any destructive effect from the drying operation other than the evaporation of moisture. This drying operation may be carried out in a partial vacuum if desired or necessary, but ordinarily it will be carried out at atmospheric pressure. When the moisture content has been reduced to a point below that at which fermentation will occur, and before complete cooling, the material is consolidated into a coherent mass, this being accomplished at a temperature sufficient to permit the natural binding substances of the original product to be employed in holding the structurally individual cells or particles together. The consolidation of the partially dried particles is preferably accomplished in such a way as to produce a food product in the form of a film or sheet of material having a crinkled, irregular surface of somewhat crepe-like appearance. The film is continuous and can be folded or otherwise arranged to produce a laminated structure having innumerable channels and passages which render the entire mass pervious to air and moisture, so that liquid will have ready access to and be rapidly reabsorbed by the entire mass when it is added thereto for the purpose of preparing the product for consumption.

The method of the present invention is adapted for use particularly with non-starchy, non-farinaceous foods having a more or less pronounced cell structure. It has been successfully carried out with a wide variety of products, including a number of fruits of which apples, bananas, peaches, plums, prune plums, cranberries, raspberries and blueberries may be mentioned as typical examples. As examples of vegetables which have been successfully treated, tomatoes, carrots, onions and beets may be mentioned. Prepared foods such as apple-sauce, tomato products and the like have also been successfully treated. It will be found equally successful with other foods of the same general type or with combinations thereof.

The original material, whether a natural or a prepared product, may, if necessary, be treated to produce a pulpy or semi-fluid mass. If a natural product is employed, it is first washed and then subjected to a suitable pulping operation in which the skin, seeds, pits, stems and other waste portions may be removed and the body of the product is converted into a pulp which is then available for drying.

Certain products such, for example, as grapes, grapefruit, cherries and citrus fruits, are well adapted for preservation by the present invention except that they do not possess a sufficient cell structure to be entirely satisfactory. That is, they do not have a large enough number of cell bodies to adapt them to the present process. Such fruits can be readily conditioned and provided with the necessary particles by adding to the pulp a suitable amount of such particles obtained from other sources. The residue from certain industries, such as the pectin industry, consists largely of the cellular particles of fruits from which all flavors, juices, sugars, pectin, and the like, have been extracted, leaving only the pure but tasteless cell bodies. This material can readily be added to the pulps of those foods deficient in suitable cell structure in order to augment their cellular particles.

With other foods such, for example, as apples and beets it is desirable to soften the article before the pulping operation. When it is desired to maintain the characteristics of an uncooked article, the softening is done with a minimum amount of cooking to produce the desired softening without affecting the food value, taste or color of the material. If desired, of course, any suitable amount of cooking can take place. Thereupon, the softened material is subjected to the above described pulping operation.

Referring to the accompanying drawings which illustrate one of the various types of apparatus adapted to carry out the present process, the material is applied to a suitable drying surface in a way to insure the drying of the cells in such a dispersed or isolated condition that each individual particle 10, which may consist of a cell or group of cells, is subjected to substantially the same amount of drying heat.

Figure 2:
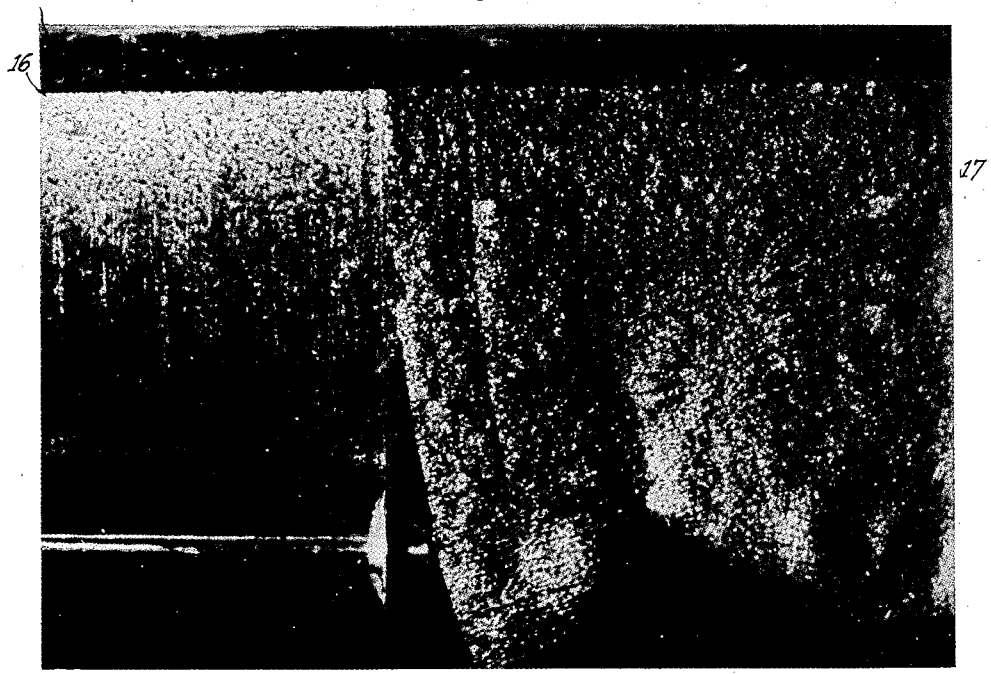

Any suitable type of heating surface can be employed, it only being necessary that such surface be practically smooth. As illustrated in Figs. 1 and 2, it may be in the form of a revolving drum 11, the outer face of which forms the drying surface, or it may be a disc, a travelling metallic belt, or any suitably heated flat surface. As indicated roughly in Fig. 3, the particles should be applied to the drying surface closely enough to efficiently utilize the entire surface and conserve the heat units which would escape between the particles should the pulp be applied too sparsely. On the other hand the pulp must not be applied so thickly as to produce a solid layer thereof on the drying surface. The cellular particles are dispersed and separated on the drying surface in such a way that substantially all particles are subjected directly to the heat thereof so that no particle is effectively insulated therefrom by any appreciable quantity of other particles. The material may be fed to the drying surface by any mechanism compatible with the consistency of the product. For example, the material may be deposited on the drum from a trough 13 and dispersed over the surface by spreader rolls 14.

Whatever type of drying surface is employed its temperature should be sufficiently high to evaporate the desired amount of moisture from the material so rapidly as to minimize any destructive effect of the heat upon the food particles, other than the evaporation of moisture therefrom, and to leave the particles comprising the original cellular material in a relatively dry dispersed condition having the concentrated natural binding substances such as sugars, acids, pectin or the like associated therewith. The temperature and the time of drying are directly related and must be carefully coordinated so as to accomplish the desired degree of drying preferably within the shortest time possible. The drying period can, if desired, be varied from one second to a relatively long period, but in commercial operations it will ordinarily be approximately from two and one-half to thirty seconds. A shorter time of exposure requires an excessive temperature, while a longer period, at a lower temperature permits the material to deteriorate under the action of oxidation. If complete sterilization is desired then a high heat for a short time is employed because a low heat for a long time will not properly sterilize the product, but, in most instances, the temperature should be sufficient to sterilize the product.

In order to remove the finished product from the drying surface it is advisable that the temperature of both the surface and the product be above the melting point of sugar. Below this point the sugar on the particles may harden on and stick to the drying surface and render it difficult to remove the dried product. On the other hand, if the temperature is too high the material, when placed upon the heated surface, will be separated therefrom by a thin wall of steam which will act as an insulator between the wet pulp and the drying surface and materially reduce the rate of evaporation and increase the number of heat units necessary to obtain the requisite dryness. At the same time, the product must not be heated to such an extent as to damage its esters or vitamins, affect its color, or caramelize the sugar. The entire treatment of the material is such as to be least injurious to the vitamins, the esters and the like.

I have obtained entirely satisfactory results by drying apple pulp, for approximately 18 seconds, on the outer surface of a rotating drum of conventional construction heated interiorly by steam at approximately 30 pounds pressure, giving a surface temperature in the neighbourhood of 104° C.; also, for about 8 seconds, on the surface of a drum having an inner steam pressure of 50 pounds, giving a surface temperature of approximately 114° C.; and for about 3 seconds on the surface of a drum heated by steam at 75 pounds pressure, giving a surface temperature of approximately 123° C. I have also obtained satisfactory results by drying banana pulp for about 20 seconds on a drum heated by steam at 29 pounds pressure, giving a surface temperature of approximately 103° C.; also for about 3 seconds on a drum heated by steam at 68 pounds pressure, giving a surface temperature of approximately 120° C. I have successfully dried tomato pulp by heating for about 60 seconds on a drum heated by steam at 14.5 pounds pressure, giving a surface temperature of approximately 90.5° C.; and also by heating for about 28 seconds on a drum heated by steam at 30 pounds pressure, giving a surface temperature of approximately 104° C. As another example of a vegetable, beets have been successfully dried by heating for about 4 seconds on a drum heated by steam at 50 pounds pressure, giving a surface temperature approximating 114° C.; and also by heating for about 7½ seconds on a drum heated by steam at approximately 33 pounds pressure, giving a surface temperature of about 106° C.

Evaporation of the moisture content to the desired point leaves the dried structurally individual particles 10 of cellular material dispersed over the drying surface in a more or less scattered arrangement as indicated in Fig. 4. These particles are removed from the surface by a suitable scraper or knife 15 which may be of any desired construction and arrangement capable of maintaining a constant contact across the entire extent of the drying surface during the relative movement between such surface and the scraper. The contact must be sufficiently close to remove all pulp cells or particles so that the surface is perfectly clean and free of all particles of pulp, sugar, acid or any other part of the original material. At the same time the scraper must be of such construction that it will pass smoothly over the surface without cutting into it, and it should be capable of operating when the relative movement between the scraper and the drying surface is upward of one hundred feet per minute. A flexible knife blade 15 of stainless steel, the edge 16 of which is pressed against the drying surface with sufficient pressure to provide the necessary contact across the entire surface, has proven to be entirely satisfactory. As the particles engage the knife edge their progress is arrested and their adhesion to the drying surface broken. The particles, which are, in effect, surrounded with the concentrated natural binding substances in a tacky condition, are forced against each other at or near the edge of the knife blade and, as will appear from Fig. 2, this accumulation of the particles causes them to be consolidated into a unitary mass in the form of a continuous porous sheet or film 17, the particles being held in this form by the binding substances above mentioned. The film or sheet is gradually forced across the scraper and is collected in any suitable receptacle. The porosity of the film appears to result partly from the irregular manner in which the cells and particles are consolidated, leaving numerous small openings between the cells or particles.

Figure 5:
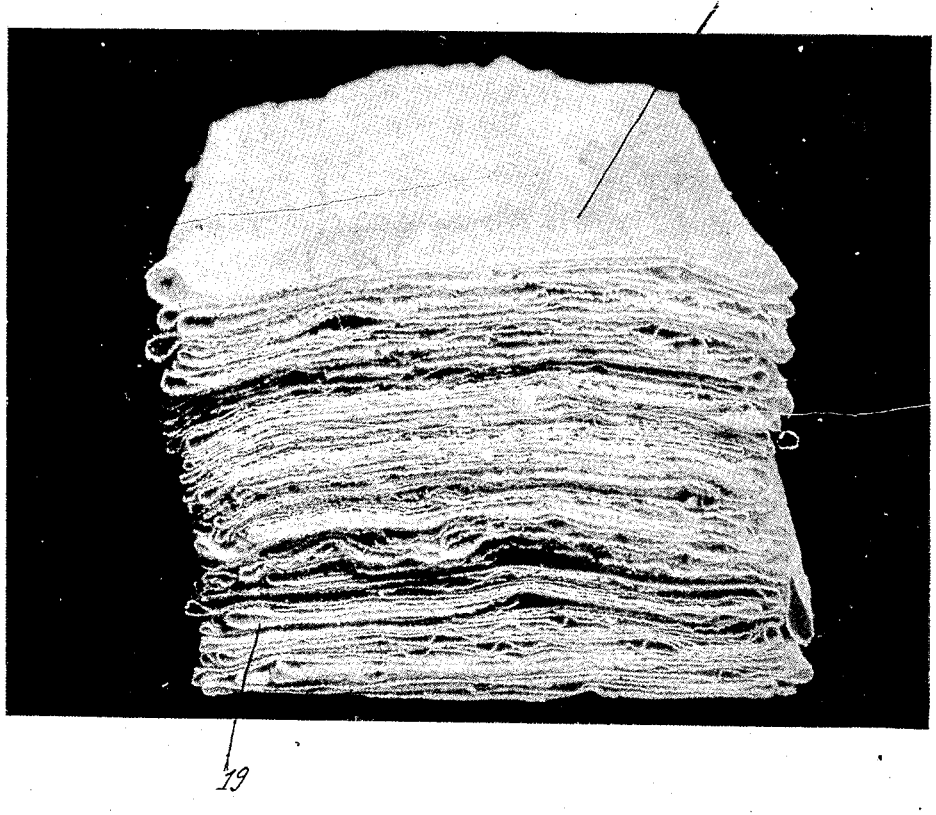
Fig. 5 is a perspective view showing one end of a laminated mass of the finished material ready for packing; the scale of this figure corresponding to that of Fig. 2.

The consolidation of the particles of cellular material upon the removal from the drying surface occurs in such a way as to provide the film with a wavy irregular surface 18 of somewhat crepe-like appearance. The film is flexible and can be folded or otherwise arranged to provide a laminated product 19, illustrated in Fig. 5, which is filled throughout with passages and channels rendering the entire mass pervious to air and moisture. The interlaminal capillarity provides an aeriferous mass able to "breathe" under varying atmospheric conditions and is conducive to the rapid reabsorption by or infiltration of liquid to the entire mass when it is desired to prepare the product for consumption or other use.

When foods having a high percentage of amorphous and/or invert sugar are being dried it is advisable to accelerate the cooling operation as soon as the particles are separated from the drying surface, for the purpose of hardening the sugar and preventing the material from sticking to and piling up on the scraper. This is preferably done by cooling the blade which not only prevents the material from sticking to the blade and permits it being removed from the blade in the form of a continuous film or sheet, but also extracts surplus residual heat from the material as soon as it is consolidated. Any suitable form of water jacket 20 can be employed for this purpose. Other means of cooling will be apparent such, for example, as a suitable air blast directed onto the material in proximity to the blade.

Although the relative movement between the drying surface and the scraper may be as high as one hundred feet per minute, this does not mean that the film or sheet of consolidated particles leaves the knife at any such velocity. As a result of the scattered distribution of particles on the drying surface a relatively large number of feet of surface must be scraped to produce a foot of consolidated film. Hence, although the drying surface, for example, may be travelling at say one hundred feet per minute the film will move across the knife at a considerably lower rate.

The equal heating to which the entire mass is subjected produces a high degree of homogeneity in the finished product and the rapidity of the entire operation minimizes any destructive effect upon the natural juices and essences of the original product, other than the elimination of moisture. The finished product has a moisture content appreciably below that at which fermentation occurs, preferably from 4½% to 7% by weight, and a mechanical structure of such formation as to accelerate the reabsorption of liquid and provide for the rapid reincorporation thereof in the mass to produce an edible food approximating in nutriment and palatability the original product.

Although I have herein referred specifically to the preparation of a material for use as a food, it will be apparent that the product of this invention may be employed for other purposes.

I claim:

1. The improvement in the art of preparing a concentrated food product of reduced moisture content from material of cellular formation which comprises subjecting the cells in a dispersed condition to heat sufficient to reduce the moisture content to a predetermined point, and consolidating the dispersed and partially dried cells into a coherent mass while at such a temperature that the concentrated natural binding substances of the original material will hold said cells together.

2. The improvement in the art of preparing a concentrated food product of reduced moisture content from material of cellular formation which comprises subjecting the cells in a dispersed condition to heat sufficient to reduce the moisture content to a predetermined point, and consolidating the dispersed and partially dried cells into a coherent mass having the form of a porous film with a crepe-like surface at such a temperature that the concentrated natural binding substances of the original material will hold said cells together.

3. The improvement in the art of preparing a concentrated food product of reduced moisture content from material of cellular formation comprising forming a pulp of said product, then partially drying said pulp in dispersed particles of cellular material, and thereafter consolidating the said partially dried particles at such a temperature that constituent binding substances of the original material will hold said particles together.

4. The improvement in the art of preparing a concentrated food product of reduced moisture content from material of cellular formation comprising forming a pulp of said product, then partially drying said pulp in dispersed particles of cellular material, thereafter consolidating the partially dried particles in adhering relation to each other and extracting residual heat therefrom.

5. The improvement in the art of preparing a concentrated food product of reduced moisture content from material of cellular formation comprising forming a pulp of said material, distributing the pulp over an extended area to substantially separate and disperse the cells, reducing the moisture content of the material to a predetermined point without substantially injuring the cell structure, and consolidating the dispersed and partially dried cells at such a temperature that the natural binding substances of the original material will hold said cells together.

6. The improvement in the art of preparing a concentrated food product of reduced moisture content from a material of low cellular content comprising adding cellular material thereto, then partially drying said material in dispersed particles of cellular material, and thereafter consolidating the said partially dried particles at such a temperature that constituent binding substances of the original material will hold said particles together.

7. The improvement in the art of preparing a concentrated food product of reduced moisture content from a material of cellular formation comprising forming a pulp of said material, dispersing the pulp over an extended area to substantially separate the cells, reducing the moisture content of the material to a predetermined point without substantially injuring the cell structure, and consolidating the dispersed and partially dried cells in the form of a thin porous film and at such a temperature that the natural binding substances of the original material will hold said cells together.

8. The improvement in the art of preparing a concentrated food product of reduced moisture content from a material of cellular formation comprising forming a pulp of said material, dispersing the pulp over an extended area to substantially separate the cells, reducing the moisture content of the material to a predetermined point without substantially injuring the cell structure, and consolidating the dispersed and partially dried cells to form a thin porous film having an irregular crepe-like surface and at such a temperature that the natural binding substances of the original material will hold said cells together.

9. The improvement in the art of preparing a concentrated food product of reduced moisture content from natural materials containing cellular particles which consists in finely dividing the natural material, distributing the same upon a heated surface in such a dispersed condition that each particle will be subjected to substantially an equal amount of heat, while in dispersed condition reducing the moisture content to less than 7 per centum, then progressively removing the dispersed particles of said material and simultaneously with said removal consolidating the particles into a coherent mass.

10. The improvement in the art of preparing a food product which comprises distributing particles of cellular material on a drying surface in such a dispersed condition that each particle will be subjected to substantially an equal amount of heat, reducing the moisture content to a point below that at which fermentation occurs, progressively removing said particles from said surface and simultaneously pressing said particles together to form a continuous film having an irregular crepe-like surface, and arranging said film to provide a laminated mass in which the contiguous irregular surfaces of said film provide interlaminal channels rendering the entire mass pervious to air and moisture.

11. An article of manufacture comprising a relatively thin porous film of concentrated cellular food material having a low moisture content and an irregular crepe-like surface.

12. An article of manufacture comprising a laminated cellular food product of low moisture content, each lamination comprising a thin porous film having irregular crepe-like surfaces which in conjunction with adjacent films provide interlaminal channels extending throughout the interior of the mass and rendering the mass liquid absorptive.

13. A concentrated food product of reduced moisture content comprising separately dried, structurally individual particles of non-starchy non-farinaceous cellular food material held together by the interposed soluble binding substance associated with each particle comprising the concentrated cementitious constituents of the material, providing a porous product in which the individual particles are readily accessible to liquid.

In testimony whereof, I have signed my name to this specification this 22nd day of December, 1931.

JACK D. SARTAKOFF.